Figure 1:
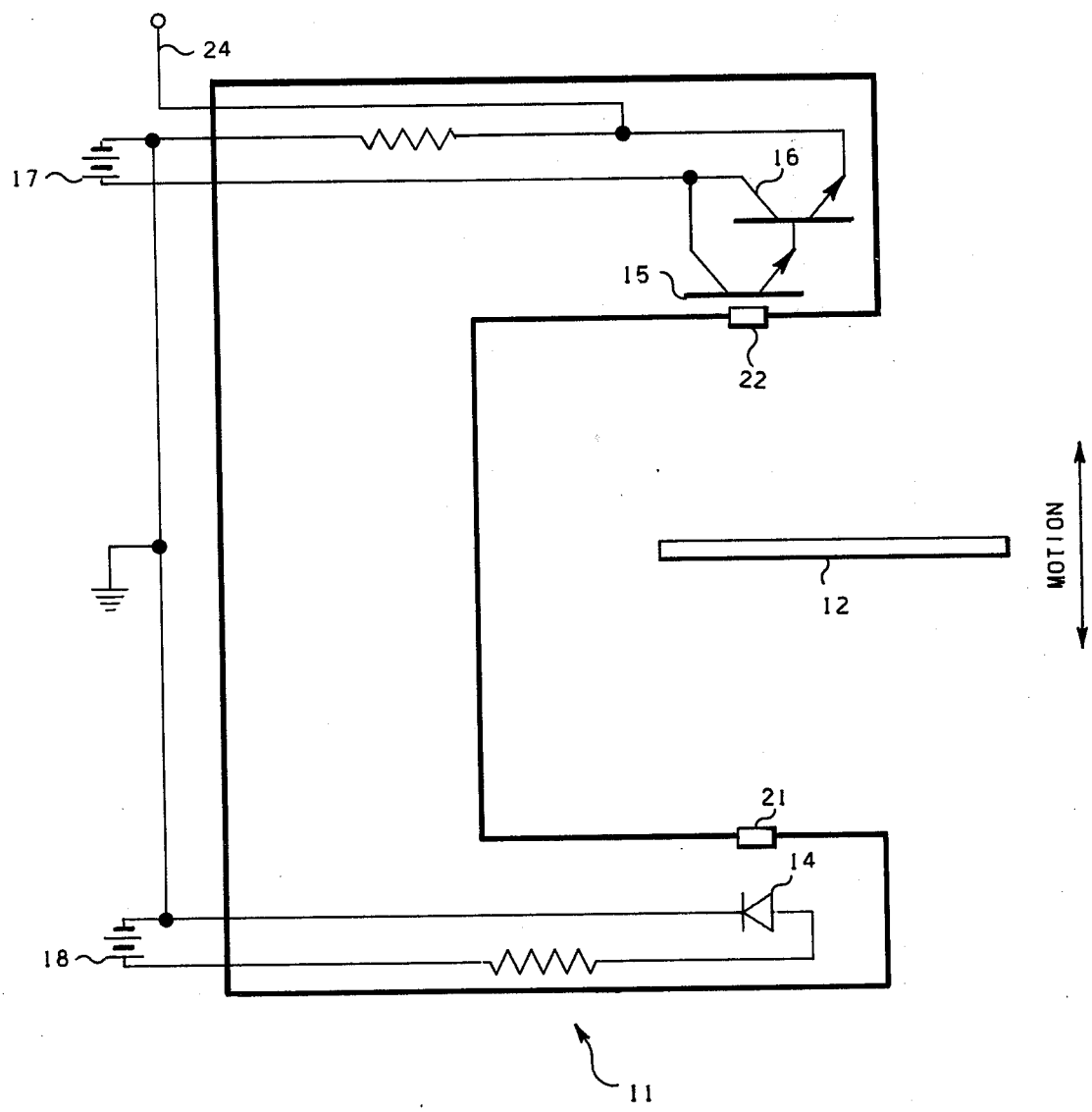

United States Patent [19]

Janzen

[11] 4,166,950

[45] Sep. 4, 1979

[54] MECHANICAL MOTION DISPLACEMENT TO ELECTRICAL SIGNAL CONVERTER

[75] Inventor: Jay Janzen, Bartlesville, Okla.

[73] Assignee: Phillips Petroleum Company, Bartlesville, Okla.

[21] Appl. No.: 864,123

[22] Filed: Dec. 23, 1977

[51] Int. Cl.² ............................................. G01D 5/34
[52] U.S. Cl. ............................ 250/231 R; 250/237 R
[58] Field of Search ............... 250/229, 231 R, 231 P, 250/237 R

[56] References Cited

U.S. PATENT DOCUMENTS

| | | | |
|---|---|---|---|
| 3,305,691 | 2/1967 | Hock | 250/235 |
| 3,590,261 | 6/1971 | Snook et al. | 250/231 R |
| 3,742,233 | 6/1973 | Gorgens et al. | 250/231 R |
| 3,831,024 | 8/1974 | Gill et al. | 250/229 |
| 3,835,316 | 9/1974 | Checchetti | 250/231 P |
| 3,842,261 | 10/1974 | MacGovern et al. | 250/231 SE |
| 3,863,067 | 1/1975 | Guolei | 250/231 R |

*Primary Examiner*—James B. Mullins

[57] ABSTRACT

A method and apparatus for converting mechanical motion displacement to an electrical signal is disclosed. A translucent light scattering member is located between a light source and a light sensor capable of generating an electrical signal representative of the intensity of the light received by the light sensor. The translucent member is moved in a direction parallel to the light beam between the light source and the light sensor in response to a mechanical motion displacement in such a manner that the intensity of the light received by the light sensor is a function of the mechanical motion displacement.

9 Claims, 2 Drawing Figures

MECHANICAL MOTION DISPLACEMENT TO ELECTRICAL SIGNAL CONVERTER

This invention relates to a mechanical motion displacement to electrical signal converter. In a particular aspect, this invention relates to a simple method and apparatus for using optics to convert motion displacements caused by small mechanical movements or other small physical movements such as earth tremors which are translated to mechanical movements into an electrical signal.

Instrumentation capable of converting or transducing mechanical motion displacement into intelligently useful data are widely used in an endless number of applications. It is particularly useful to convert mechanical motion displacement into an electrical signal because of the wide use of electrical systems in data processing and control functions. An example of this is where minute earth movements are recorded as electrical signals for ease in processing. Also a weight scale may transform a movement into an electrical readout or an acoustical microphone may transform membrane movements caused by sound into electrical signals.

Mechanical motion displacement to electrical signal converters often use optics. It is well known that the intensity of a light source on a sensor such as a photoelectric cell determines the voltage of the output signal from the sensor. Thus if mechanical motion displacement is utilized to vary the intensity of the light source, an electrical signal representative of the mechanical motion displacement is generated by the sensor.

In the past mechanical motion displacement to electrical signal converters which used optics have been complicated because the intensity or direction of the light source was usually modulated by using mechanically shaped apertures which could be utilized to increase or decrease the intensity of the light reaching the sensor. Accordingly, it is an object of this invention to provide a simple method and apparatus for using optics to convert motion displacements caused by small mechanical movements or other small physical movements such as earth tremors which are translated to mechanical motion into an electrical signal.

In accordance with the present invention, a method and apparatus is provided whereby an optical system capable of converting light to an electrical signal is utilized to convert mechanical motion displacement into an electrical signal. This is accomplished by placing a translucent light scattering member between the source and the sensor of the optical system. The translucent light scattering member is moved, usually by mechanical means, in response to the mechanical motion displacement. This changes the fraction of the forward scattered light intercepted by the sensor and thus the electrical output signal of the optical system varies in response to the mechanical motion displacement. The apparatus is easily calibrated to form a very linear mechanical motion displacement to electrical signal converter.

Figure 2:
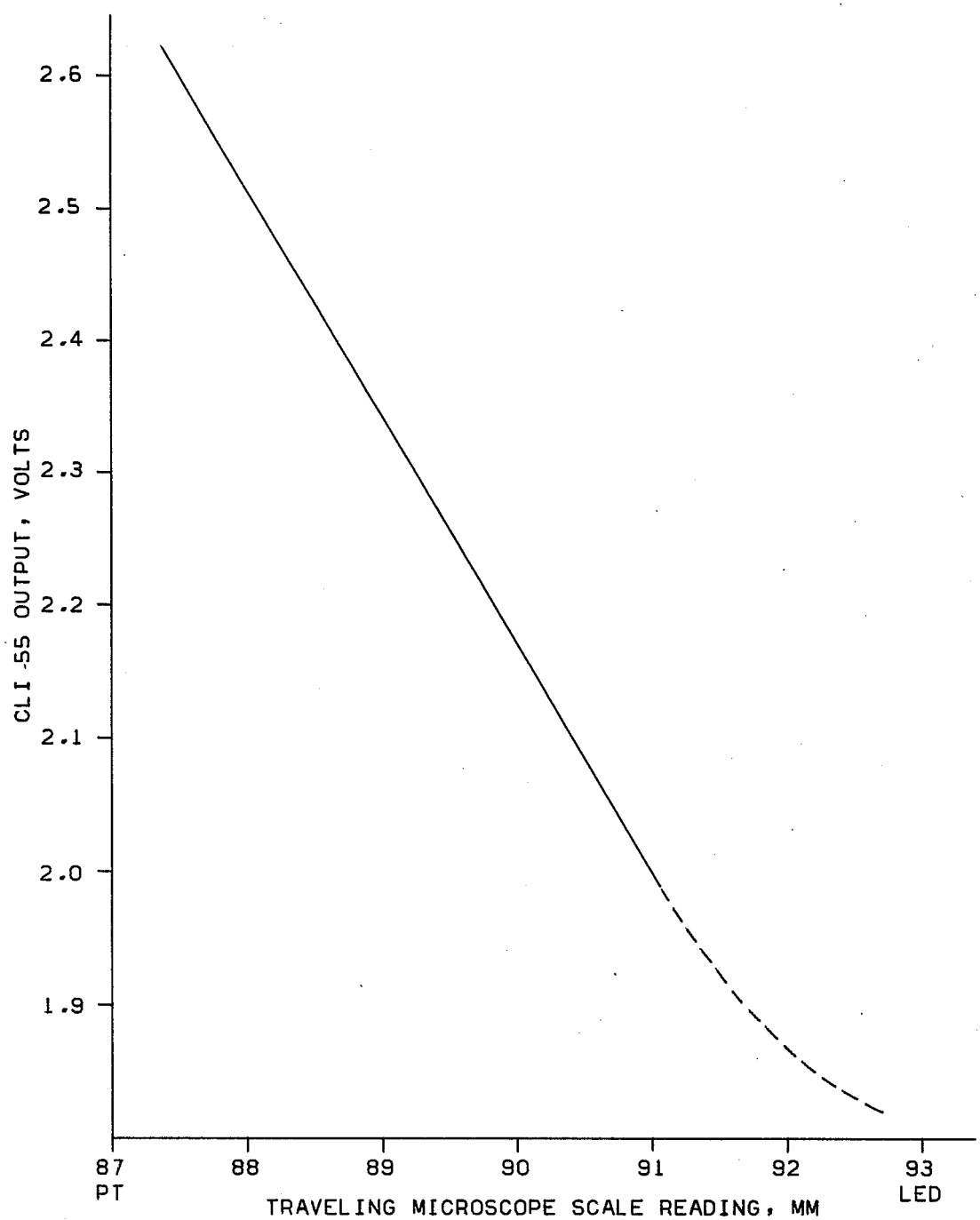

Other objects and advantages of the invention will be apparent from the description of the invention and the appended claims thereto as well as from the detailed description of the drawings in which:

FIG. 1 is a side view of an optical switch which is used in conjunction with a translucent light scattering member to form a mechanical motion displacement to electrical signal converter; and FIG. 2 is a graph showing the actual performance characteristics of the mechanical motion displacement to electrical signal converter of FIG. 1.

The invention is described in terms of a preferred embodiment wherein an optical switch is utilized to convert light to an electrical signal. The invention is, however, applicable to other optical systems capable of converting light to an electrical signal such as systems which utilize a photoelectric cell.

Referring now to the drawings and in particular to FIG. 1, an optical switch 11 is shown together with a translucent light scattering member 12. In this preferred embodiment, the optical switch 11 is a CLI-55 manufactured by Clairex Electronics, Mt. Vernon, New York. The light scattering member may range from a specially manufactured member having some desired optical and/or mechanical properties to a microscope slide which has been frosted. In this particular embodiment the microscope slide was frosted and utilized as a light scattering member. The light scattering member may be planar or curved depending on the optical properties that are desired. Frosted glass, translucent plastic sheets, and other similar materials may be used to form the light scattering member.

The light scattering member is usually supported by mechanical means. In this particular embodiment a microscope was utilized to support and move the frosted microscope slide which was utilized as a light scattering member.

The optical switch 11 contains an infrared light-emitting diode 14 which is used as a light source and a NPN darlington phototransistor 15 as a sensor. The transistor 16 provides amplification. Power is supplied from voltage supplies 17 and 18 which, in this preferred embodiment, are 5 volt power supplies. The lenses 21 and 22 are glass. The output signal 24 is taken from the emitter of transistor 16.

The translucent light scattering member 12 is moved from some zero position to a new position in response to some mechanical motion displacement caused by such factors as force, pressure, sound or vibrations. The movement of the member 12 causes either more or less of the scattered light to be received by the sensor 15 causing the output signal 24 to vary as a function of the mechanical motion displacement. Less light will be diffracted out of the viewing range of the sensor when the member 12 is closer to the sensor 15 and more light will be diffracted out of the viewing range of the sensor when the member 12 is farther from the sensor 15. Thus, the output signal 24 increases when the member 12 is moved closer to the sensor 15 and decreases when the member 12 is moved farther away from the sensor 15. The system may be calibrated in such a manner that a known mechanical motion displacement will cause a known output signal 24 to be generated.

An advantage of this invention lies in the fact that modulation of the light is achieved even though the intensity and direction of the source is not changed. No physical contacts or carefully tailored capacitors, inductors or mechanical filters are required as have been required in most systems in the past. New freedom is obtained in the field of using optics in mechanical motion displacement to electrical signal converters by this invention.

FIG. 2 shows a plot of the output signal 24 of the optical switch 11 as a function of the movement of the member 12. The plotted line 31 represents the voltage level of the output signal 24 as a function of the position of the member 12. A microscope was utilized to move a microscope slide which was frosted. The higher microscope scale readings represent positions nearer the light-emitting diode 14. A high degree of linearity and sensitivity were achieved, which is desirable in a mechanical motion displacement to electrical signal converter.

The invention has been described in terms of the presently preferred embodiment.

Reasonable variations and modifications are possible, by those skilled in the art, within the scope of the described invention and the appended claims.

That which is claimed is:

1. Apparatus comprising:
    a light source;
    a light sensing means capable of generating an electrical output signal representative of the intensity of the light beam from said light source received by said light sensing means;
    a translucent light scattering member located between said light source and said light sensing means in such a manner that the light beam from said light source must pass through said translucent light scattering member in order to reach said light sensing means;
    means for moving said translucent light scattering member in a direction at least substantially parallel to the portion of the path of said light beam from said light source to said light sensing means which is between said light source and said translucent light scattering member, in response to a mechanical motion displacement in such a manner that the intensity of the light received by said light sensing means is changed as a function of said mechanical motion displacement, thus changing said output electrical signal in response to said mechanical motion displacement.

2. Apparatus in accordance with claim 1 wherein said light source and said light sensing means are contained in an optical switching means.

3. Apparatus in accordance with claim 1 wherein said light source is an infrared light-emitting diode and said light sensing means is a NPN darlington phototransistor.

4. Apparatus in accordance with claim 3 wherein said infrared light-emitting diode and said NPN darlington phototransistor are contained in an optical switching means.

5. Apparatus in accordance with claim 1 additionally comprising:
    a first lens associated with said light source located in such a manner that light from said light source passing to said light sensing means must pass through said first lens; and
    a second lens associated with said light sensing means located in such a manner that light from said light source must pass through said second lens to reach said light sensing means.

6. Apparatus in accordance with claim 1 wherein said light source is a constant intensity light source.

7. A method for converting a mechanical motion displacement into an electrical signal comprising the steps of:
    passing a light beam through a translucent light scattering member, detecting a portion of said light beam transmitted through said translucent light scattering member and generating an electrical output signal representative of the intensity of the detected light beam; and
    moving said translucent light scattering member in a direction at least substantially parallel to said light beam in response to a mechanical motion displacement to thereby vary the portion of said light beam which is detected as a function of said motion displacement, thus varying said electrical output signal in response to said mechanical motion displacement.

8. A method in accordance with claim 7 wherein said light beam is a constant intensity light beam.

9. A method in accordance with claim 7 wherein said detecting of a portion of said light beam is performed at a constant distance from the source of said light beam.

* * * * *